Nov. 11, 1930.   H. L. FISCHACHER   1,781,635
OVEN SCOOP
Filed Oct. 15, 1928
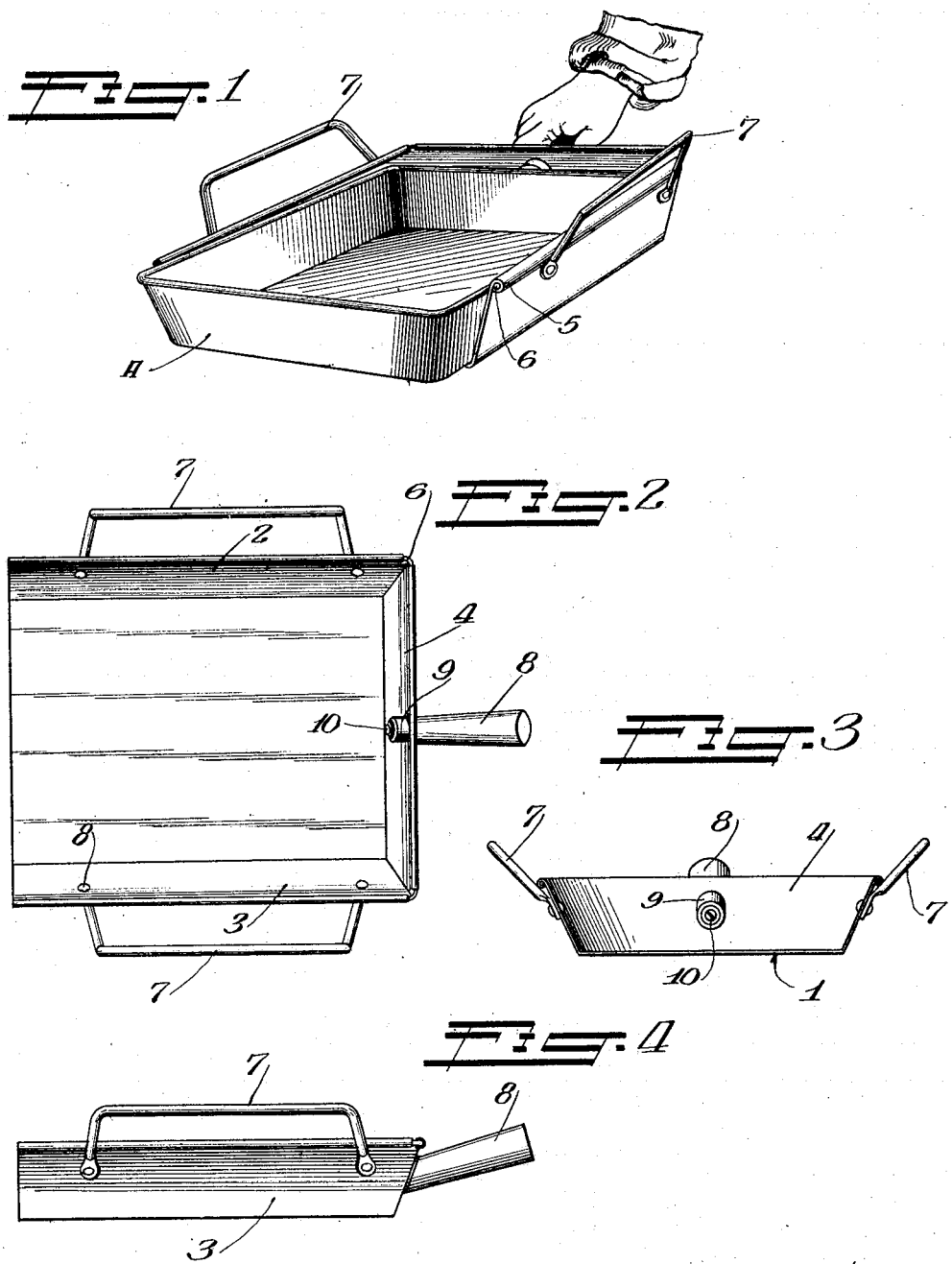
Inventor:
Henry L. Fischacher,
by Charles H. Hills Atty.

Patented Nov. 11, 1930

1,781,635

UNITED STATES PATENT OFFICE

HENRY L. FISCHACHER, OF BOSTON, MASSACHUSETTS

OVEN SCOOP

Application filed October 15, 1928. Serial No. 312,492.

This invention relates to a scoop for removing hot pans from the baking ovens of kitchen stoves.

The invention is directed to a scoop which is useful in kitchens for removing hot pans from stoves or from griddles and which may readily engage a pan and withdraw the same without having to grasp the pan manually, thus eliminating the possibility of the hands of the user coming in contact with the hot pan or oven. Furthermore, handles are provided whereby the pan may be lifted or rocked for basting and the like.

An object of the invention is to provide a scoop whereby pans and the like may be readily withdrawn from baking ovens or from stove griddles without having to manually grasp the pan.

Another object of the invention is to provide a scoop for use with cooking utensils which may readily engage such utensils for movement to or from a baking oven or the griddle of a cook stove.

A further object of the invention is to provide a scoop of the character described which is economical to manufacture and efficient in use.

The above, other and further objects of the invention will be apparent from the following description, drawings and appended claims.

One form of the invention is illustrated in the accompanying drawings and the views thereof are as follows:

Figure 1 is a perspective view of a scoop embodying my invention, showing a pan within the scoop.

Figure 2 is a top plan view of the scoop.

Figure 3 is an end elevation of the scoop, looking at the open end of the same.

Figure 4 is a side view of the scoop.

The accompanying drawings will now be explained.

The scoop of my invention consists of an open ended member having a flat bottom 1, side walls 2 and 3, and one end wall 4. The walls are integral with the bottom and are inclined upwardly away from the bottom, making an obtuse angle with the bottom.

The upper edges of the side walls are bent outwardly, downwardly and inwardly, forming a bead 5, in which is arranged a reinforcing member 6.

Handles 7 are attached to the side walls 2 and 3 by means of bolts, rivets or similar fastening members 8, passing thru the downturned portions of the handles and suitably arranged apertures in the side walls. These handles are arranged to incline outwardly from the bottom of the scoop.

A handle 8 is secured in the end wall 4, preferably centrally of the wall, and is arranged at an angle to said end wall so as to project upwardly from the bottom of the scoop. The handle 8 may be secured in the end wall 4 in any suitable manner. I have shown a plug or stop 9 inwardly of the end wall 4, thru which passes a screw or bolt 10, which enters the handle 8. The stop 9, in addition to serving as part of the attaching means for the handle 8, serves also as a stop, against which one edge of a roasting pan A rests when the same is in the scoop.

When it is desired to remove a pan from the oven, the scoop is pushed under the pan until the front end of the pan comes against the stop 9, whereupon the scoop, with the pan A therein, is raised by the handle 8 and withdrawn. The handle 8 may be used to raise the scoop and its contained pan when the contents of the pan is light, such as a cake or the like, and the handles 7 may be used for lifting the scoop and its contained pan when the pan contains heavy matter, such as a roast of meat. The handles 7 are useful in moving the scoop and its contained pan when basting the meat in the pan, in which event the pan is rocked slightly and, after basting, the pan is again returned to the oven for further cooking.

The pan A may be readily removed from the scoop by the use of any convenient tool, such as a knife, fork or spoon, against the front end of the pan, whereby the pan is pushed off of the scoop while the operator holds the scoop by means of the handle 8.

The scoop is slid under the pan A when the same is in the oven by being pushed under the same until the stop 9 comes in contact with the front wall of the pan, whereupon the scoop and its pan may be removed, as before described. Should it happen that the pan is pushed against the rear of the oven in applying the scoop to the pan, no burning of the hand or arm of the operator can occur, because of the construction of the scoop as heretofore described.

While I have described, more or less precisely, the details of construction of my invention, yet, I do not wish to be understood as limiting myself thereto, as I am aware that changes may be made in the arrangement and proportion of parts and that equivalents may be substituted, all without departing from the spirit and scope of my invention.

I claim as my invention:

1. A cooking pan scoop comprising a member having a flat bottom and two side walls and one end wall, with the opposite end open, a handle on the end wall, and a member arranged to attach the said handle to the end wall and to form a stop inwardly of the said scoop for abutment by a pan.

2. A cooking pan scoop comprising a member having a flat bottom and two inclined side walls and one end wall, with the opposite end open, a handle on the end wall, a member arranged to secure the said handle to the end wall and to form a stop inwardly of the said scoop for abutment by a pan, and means to assist in the rocking of the scoop to baste meat in a pan on the scoop, the said means comprising a handle rigidly secured on each of the side walls and extending upwardly and outwardly in the same general direction as the side walls.

In testimony whereof I have hereunto subscribed my name at Boston, Suffolk County, Massachusetts.

HENRY L. FISCHACHER.